United States Patent [19]

Yamamoto et al.

[11] Patent Number: 5,075,429

[45] Date of Patent: Dec. 24, 1991

[54] MONOAZO-DISPERSE DYE COMPOUNDS THEIR PRODUCTION AND THEIR USE

[75] Inventors: Jun Yamamoto; Yasuyoshi Ueda, both of Osaka; Takashi Omura, Hyogo; Yosuke Yamamoto, Osaka; Hideo Hattori, Osaka; Junichi Sekihachi, Osaka, all of Japan

[73] Assignee: Sumitomo Chemical Company Limited, Osaka, Japan

[21] Appl. No.: 419,327

[22] Filed: Oct. 10, 1989

[30] Foreign Application Priority Data

Oct. 11, 1988 [JP] Japan .................. 63-256772

[51] Int. Cl.$^5$ .................. C09B 29/045; C09B 29/09; C09B 29/44; D06P 1/18
[52] U.S. Cl. .................. 534/768; 534/788; 534/794; 534/829; 534/831; 534/850; 534/852; 534/856; 534/859
[58] Field of Search .............. 534/768, 788, 794, 850, 534/852, 856, 859, 829, 831

[56] References Cited

U.S. PATENT DOCUMENTS

| | | | |
|---|---|---|---|
| 3,991,042 | 11/1976 | Kulthau | 534/768 X |
| 4,002,604 | 1/1977 | Fawkes et al. | 534/768 X |
| 4,051,084 | 9/1977 | Kulthau et al. | 534/788 X |
| 4,278,599 | 7/1981 | Clark | 534/850 |
| 4,914,190 | 4/1990 | Liechti et al. | 534/850 X |

FOREIGN PATENT DOCUMENTS

| | | |
|---|---|---|
| 49-69980 | 7/1974 | Japan . |
| 60-112857 | 6/1985 | Japan .................. 534/850 |
| 61-32969 | 6/1988 | Japan .................. 534/788 |
| 63-156864 | 6/1988 | Japan .................. 534/831 |
| 1427346 | 3/1976 | United Kingdom .............. 534/788 |

OTHER PUBLICATIONS

Irick et al., Text. Res. J., 42(7), pp. 391-397 (1972).
Naito et al., *Chemical Abstracts,* vol. 98, No. 188976y (1983).

*Primary Examiner*—Mary G. Lee
*Assistant Examiner*—Fiona T. Powers
*Attorney, Agent, or Firm*—Cushman, Darby & Cushman

[57] ABSTRACT

A monoazo compound of the formula,

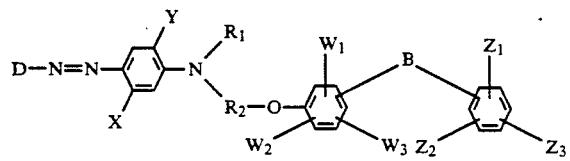

wherein D is a heterocyclic or carbocyclic compound residue such as benzothiazolyl and phenyl, X is hydrogen, alkyl, alkoxy, halogeno, acylamino or the like, Y is hydrogen, halogeno, alkyl, alkoxy and the like, $R_1$ is alkyl, $R_2$ is $C_2$-$C_4$ alkylene, B is a bridging group such as

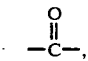

—O—, —S—, $C_1$-$C_6$ alkylene and the like, and $W_1$, $W_2$, $W_3$, $Z_1$, $Z_2$ and $Z_3$ are independently hydrogen, alkyl, halogeno or the like, which is useful for dyeing hydrophobic fiber materials to give dyed or printed product of a deep color excellent in fastness properties, particularly those such as washing fastness, even after various finishing treatments of the product.

7 Claims, No Drawings

MONOAZO-DISPERSE DYE COMPOUNDS

THEIR PRODUCTION AND THEIR USE

The present invention relates to a monoazo compound, a process for producing the same and a process for dyeing or printing hydrophobic fiber materials therewith.

More specifically, the present invention relates to a monoazo compound useful as a disperse dye for dyeing or printing hydrophobic fiber materials, particularly those such as polyester fiber materials.

With recent consumers' trend toward higher grade apparels, there is a great need for disperse dyes to be superior in dyeability and dye characteristics and have extensive applicability and capability of giving dyed or printed products excellent in their fastness properties. Under these circumstances, hydrophobic fiber materials or hydrophobic fiber-containing materials dyed or printed with disperse dyes have been often subjected to after-finishing treatments such as softening finish, antistatic finish, feel-improving finish and the like, thereby giving value added. However, the after-finishing treatments have been carried out usually at relatively high temperatures, so that problems such as dye bleeding are caused to lower the wet fastness, such as washing fastness.

There are proposed many monoazo disperse dyes, for example, monoazo dyes represented by the following formulas,

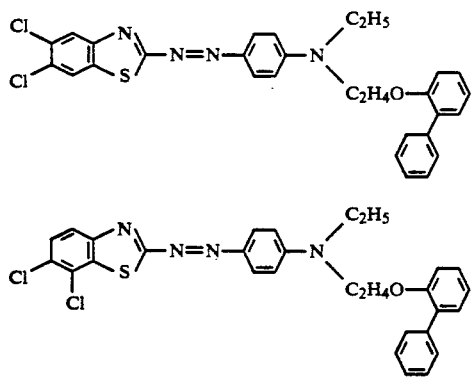

as disclosed in Published Unexamined Japanese Patent Application (hereinafter referred to as Japanese Kokai) No. 63-132969, a monoazo dye represented by the following formula,

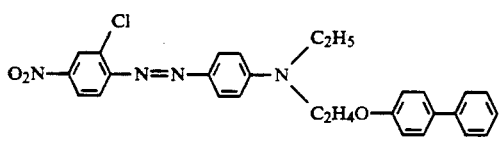

as disclosed in Japanese Kokai No. 60-112857, and a disoazo dye represented by the following formula,

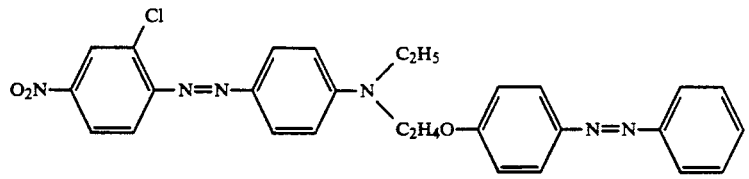

as disclosed in Japanese Kokai No. 63-156864. However, these monoazo disperse dyes are not yet sufficient to meet needs described above, and therefore awaiting for improvements.

The present inventors have undertaken extensive studies to find a monoazo compound useful for dyeing or printing hydrophobic fiber materials, particularly those such as polyester fiber materials with superior dyeability and dye characteristics such as levelling property and extensive applicability and capability of giving dyed or printed products excellent in fastness properties such as light fastness, sublimation fastness, wet fastness and the like, particularly wet fastness such as washing fastness after the after-finishing treatments of the dyed or printed products, and as a result attained to the present invention.

The present invention provides a monoazo compound represented by the following formula (I),

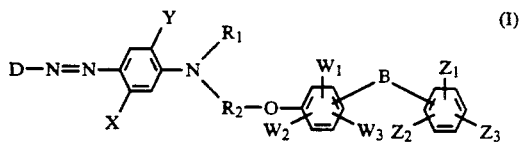

wherein D is an unsubstituted or substituted heterocyclic or carbocyclic compound residue selected from thienyls, thiazolyls, isothiazolyl, 1,2,4-thiadiazolyl, 1,3,4-thiadiazolyl, benzothiazolyl, benzoisothiazolyl, pyrazolyl, imidazolyl and phenyl; X is hydrogen, $C_1$-$C_4$ alkyl, $C_1$-$C_4$ alkoxy, acylamino, halogeno or —NH—CO—NHQ in which Q is hydrogen, $C_1$-$C_4$ alkyl or phenyl; Y is hydrogen, halogeno, $C_1$-$C_4$ alkyl, $C_1$-$C_4$ alkoxy, $C_1$-$C_4$ alkoxy-$C_1$-$C_4$ alkyl or $C_1$-$C_4$ alkoxy-$C_1$-$C_4$ alkoxy; $R_1$ is hydrogen, $C_1$-$C_6$ alkyl unsubstituted or substituted by $C_1$-$C_4$ alkoxy, $C_1$-$C_4$ alkoxycarbonyl, $C_1$-$C_4$ alkylcarbonyloxy, $C_1$-$C_4$ alkoxycarbonyloxy, phenyl, phenoxybenzoyloxy or cyano, or $C_3$-$C_5$ alkenyl; or $R_1$ and Y are taken together with the adjacent nitrogen and two carbon atoms, respectively, to form a 5- or 6-membered ring; $R_2$ is straight or branched $C_2$-$C_4$ alkylene unsubstituted or substituted by hydroxy; $W_1$, $W_2$, $W_3$, $Z_1$, $Z_2$ and $Z_3$ independently of one another are each hydrogen, chloro, bromo, $C_1$-$C_4$ alkyl, $C_1$-$C_4$ alkoxy, $C_1$-$C_4$ alkoxycarbonyl or nitro; and B is a bridging group selected from carbonyl, carbonyloxy, oxycarbonyl, imino, —O—, —S—, —CH=N—, —$SO_2$—,

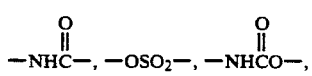

straight or branched $C_1$-$C_6$ alkylene or —$A_1$—$E_1$—$A_2$—$E_2$—$A_3$— in which $A_1$, $A_2$ and $A_3$ independently of one another are each a direct linkage, carbonyl, carbonyloxy, oxycarbonyloxy, imino, —O—, —S—, —CH=N—, —SO$_2$—,

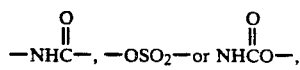

and E$_1$ and E$_2$ independently of one another are each a direct linkage or straight or branched C$_1$-C$_6$ alkylene, provided that E$_1$ is the alkylene as defined above when A$_1$ is not a direct linkage, E$_2$ is the alkylene as defined above when A$_3$ is not a direct linkage, and both E$_1$ and E$_2$ are not direct linkages at the same time when A$_2$ is a direct linkage; with the proviso that B is any one of the bridging groups other than —S— and the C$_1$-C$_6$ alkylene as defined above, when D is the benzothiazolyl as defined above.

The present invention also provides a process for producing the compound represented by the formula (I), which comprises reacting a diazonium salt of an amine represented by the following formula (II), $$D-NH_2 \qquad (II)$$

wherein D is as defined above, with a coupling component represented by the following formula (III),

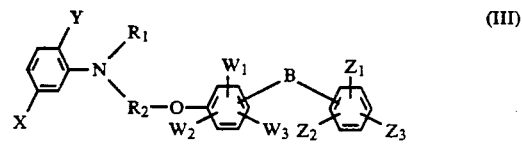

wherein X, Y, R$_1$, R$_2$, W$_1$, W$_2$, W$_3$, Z$_1$, Z$_2$, Z$_3$ and B are as defined above.

The present invention further provides a process for dyeing or printing hydrophobic fiber materials, which comprises contacting the fiber materials with the compound represented by the formula (I).

In the above formula (I), the heterocyclic or carbocyclic compound residue represented by D may be unsubstituted or substituted by C$_1$-C$_4$ alkyl, C$_1$-C$_4$ alkoxy, C$_1$-C$_4$ alkylthio, phenyl, halogeno (e.g. chloro, bromo), trifluoromethyl, cyano, nitro, acyl, benzoyl, C$_1$-C$_4$ alkoxycarbonyl (e.g. methoxycarbonyl, ethoxycarbonyl), C$_1$-C$_4$ alkylsulfonyl, phenylsulfonyl, phenoxysulfonyl, sulfonamide, arylazo (e.g. phenylazo) and the like, and two of these adjacent from each other may be taken together to form a fused ring such as phenyl, cyclic imide and the like.

Of these residues, preferred are benzothiazolyl unsubstituted or substituted once or more by methyl, methoxy, chloro, bromo, methylsulfonyl or nitro, and phenyl unsubstituted or substituted once or more by cyano, methylsulfonyl, ethylsulfonyl, chloro, bromo, formyl, acetyl, benzoyl, carbomethoxy, carboethoxy, methoxy or ethoxy. Particularly preferred are benzothiazolyl unsubstituted or substituted once or twice by chloro, bromo or methoxy, and phenyl unsubstituted or substituted once, twice, three times or four times by nitro, chloro, bromo, cyano, methylsulfonyl, ethylsulfonyl or methyl.

The —NH—CO—NHQ represented by X includes, for example, ureido, methylureido, ethylureido, phenylureido and the like, and the acylamino represented thereby can be represented by the formula, —NH—V—R, wherein V is —CO or —SO$_2$— and R is an unsubstituted or substituted alkyl or phenyl group. Examples of the acyl represented by —V—R are acetyl, propionyl, 2-chloroethylcarbonyl, 2-bromoethylcarbonyl, phenylcarbonyl, 2-methoxycarbonylethylcarbonyl, 2-ethoxycarbonylethylcarbonyl, methoxycarbonyl, ethoxycarbonyl, phenoxycarbonyl, methoxyethylcarbonyl, hydroxyethylcarbonyl, methylsulfonyl, ethylsulfonyl and the like.

Among those represented by X, preferred are hydrogen, methyl, methoxy, chloro, bromo, acetylamino, propionylamino, methylsulfonylamino and ureido. Of these, hydrogen, methyl, chloro and acetylamino are particularly preferred.

Among those represented by Y, preferred are hydrogen, chloro, bromo, methyl, methoxy, methoxyethyl, methoxyethoxy and the like. Of these, hydrogen is particularly preferred.

The C$_1$-C$_6$ alkyl represented by R$_1$ is straight or branched. Preferred is C$_1$-C$_4$ alkyl unsubstituted or substituted by, preferably, C$_1$-C$_4$ alkoxy (e.g. methoxy, ethoxy), C$_1$-C$_4$ alkylcarbonyloxy (e.g. methyl- or ethylcarbonyloxy), C$_1$-C$_4$ alkoxycarbonyl (e.g. methoxy- or ethoxy-carbonyl phenoxy or phenyl.

The 5- or 6-membered ring which can be formed by taking R$_1$ and Y together with the adjacent nitrogen and two carbon atoms, respectively, may contain another hetero atom such as oxygen, and may be unsubstituted or substituted by, for example, hydroxy, methyl, methoxy, chloro, phenyl or the like. Of these, preferred are 6-membered rings unsubstituted or substituted by 1 to 4 methyl groups. Particularly preferred are dihydroquinoline and tetrahydroquinoline which may be formed by uniting the 6-membered ring and the existing benzene ring in a body, and which may be unsubstituted or substituted by 1 to 4 methyl groups.

Among those represented by W$_1$, W$_2$ and W$_3$, preferred are independently hydrogen, chloro, methyl or methoxy. Particularly preferred is the case where W$_1$, W$_2$ and W$_3$ are all hydrogen.

Among those represented by Z$_1$, Z$_2$ and Z$_3$, preferred are independently hydrogen, chloro, methyl, methoxy, methoxycarbonyl and nitro. Particularly preferred is the case where Z$_1$, Z$_2$ and Z$_3$ are all hydrogen.

Among the bridging groups represented by B, preferred are carbonyl

—O—, —S— and the alkylene as described above, and in the bridging group represented by —A$_1$—E$_1$—A$_2$—E$_2$—A$_3$—, A$_1$, A$_2$ and A$_3$ independently of one another are preferably each direct linkage, carbonyloxy

and —O—. Preferred examples of the bridging group —A$_1$—E$_1$—A$_2$—E$_2$—A$_3$— are —O$-$(CH$_2$)$_{\overline{m_1}}$— (m$_1$:1-6), —O$-$(CH$_2$)$_{\overline{m_2}}$O— (m$_2$:1-6), —O$-$(CH$_2$)$_{\overline{m_3}}$O$-$(CH$_2$)$_{\overline{n_1}}$— (m$_3$:2-4, n$_1$:1-4), —O$-$(CH$_2$)$_{\overline{m_4}}$O$-$(CH$_2$)$_{\overline{n_2}}$O— (m$_4$:2-4, n$_2$:2-4), $-$(CH$_2$)$_{\overline{m_5}}$O$-$(CH$_2$)$_{\overline{n_3}}$— (m$_5$:1-4, n$_3$:1-4),

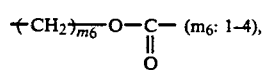

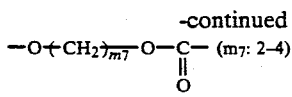

and the like. These examples may contain straight or branched alkylene groups. More concretely, there are exemplified —OCH$_2$—, —OCH$_2$CH$_2$—, —O+CH$_2$)$_{\overline{m_2}}$O— (m$_2$: 2-6), —OCH$_2$CH$_2$OCH$_2$CH$_2$—,—O—CH$_2$CH$_2$O—CH$_2$CH$_2$O—,

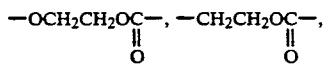

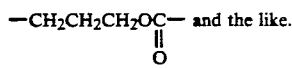

The present monoazo compound represented by the formula (I) can be produced in a manner known per se. For example, the amine represented by the formula (II) can be diazotized in a conventional manner, and the resulting diazonium compound is allowed to react with the coupling component represented by the formula (III) in a conventional manner.

The coupling component (III) can be produced also in a manner known per se. For example, a phenol represented by the following formula (IV),

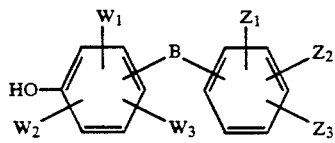

wherein W$_1$, W$_2$, W$_3$, B, Z$_1$, Z$_2$ and Z$_3$ are as defined above, is allowed to react with a dihalide represented by the following formula (V),

   (V)

wherein R$_2$ is as defined above, and Hal is halogen such as chlorine and bromine, thereby obtaining a halide represented by the following formula (VI),

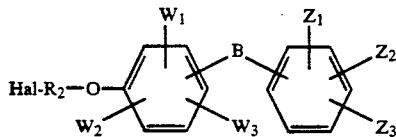

wherein Hal, R$_2$, W$_1$, W$_2$, W$_3$, B, Z$_1$, Z$_2$ and Z$_3$ are all as defined above. Successively, the halide (VI) is allowed to react with an aniline represented by the following formula (VII),

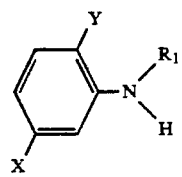

wherein X, Y and R$_1$ are as defined above, thereby obtaining the desired coupling component (III).

The monoazo compound of the formula (I) in accordance with the present invention is extensively applicable for a disperse dye and useful for dyeing or printing hydrophobic fiber materials, particularly those such as polyester fiber materials. In utilizing the present monoazo compound in such field, the compound (I) can be finely pulverized in an aqueous medium with the aid of naphthalenesulfonic acid/formaldehyde condensate, lignin sulfonic acid or the like, thereby obtaining a liquid dye dispersion. The liquid dye dispersion can be used as it is for the dyeing or printing of fiber materials, or formed to a powder by, for example, spray-drying it.

Dyeing can be carried out by a method wherein hydrophobic fiber materials are dipped in an aqueous dye bath and heated to a temperature of 105° C. or higher, preferably 110° to 140° C. under increased pressure, a carrier dyeing method wherein dyeing is carried out in the presence of a carrier such as o-phenylphenol, trichlorobenzene and the like at a relatively high temperature, for example, water-boiling temperature, or a thermosol method wherein the fiber materials are padded with an aqueous dye dispersion and dry-heated at a temperature of 150° to 230° C. for 30 to 60 seconds.

Printing can be carried out by mixing the aqueous dye dispersion with a suitable stock paste to obtain a color paste, printing fiber materials with the color paste and then steaming or thermosol-treating the printed fiber materials.

In addition, the fiber materials can also be dyed by a solvent dyeing method wherein an organic solvent such as trichloroethylene, perchloroethylene and the like is used as a dyeing medium.

The dyed or printed products thus obtained can be subjected, if desired, to after-finish treatments such as softening finish, water-repellenting finish, feel-improving finish, antistatic finish, sanitary finish and the like, in a conventional manner.

The present monoazo compound of the formula (I) can be characterized by the facts such that hydrophobic fiber materials, particularly those such as polyester fiber materials, can be dyed or printed in a usual manner using the present compound (I), thereby obtaining dyed or printed products excellent in various fastness properties such as light fastness, sublimation fastness, wet fastness and the like, and such fastness properties cannot be deteriorated even after heat-set treatment and after-finish treatments. For example, the fiber materials can be dyed using a high concentration of the dye to obtain dyed products of a deep color (e.g. JIS 2/1 depth), and the washing fastness property thereof is robust so that it can be kept at a higher degree even after the heat-set treatments of dyed products than that of those dyed with existing disperse dyes.

The present monoazo compound of the formula (I) can be characterized also by superior dyeability such as dyeing power and build-up property, and extensive applicability, so that dyed or printed products of a deep and level color can be readily obtained. Moreover, the present compound can be used in combination with other dyes to improve the dye performance and to obtain a variety of color.

In consideration of the characteristic features described above, the monoazo compound of the present invention can be advantageously used particularly for the dyeing of apparels such as sportswear, which are required to be dyed usually in a deep color and have superior washing fastness because they are to be washed again and again.

The present invention is illustrated in more detail with reference to the following Examples, which are only illustrative but not limitative for the scope of the present invention. In Examples, parts are by weight.

EXAMPLE 1

2-Chloro-4-nitroaniline (56 parts) was dispersed in 78% sulfuric acid (100 parts), and 43% nitrosylsulfuric acid (110 parts) was added to the dispersion, while keeping the temperature at 35° to 40° C., thereby performing diazotization. The resulting diazonium liquor was added to a glacial acetic acid-methanol (25:2) solution containing N-ethyl-N-2-(4-benzylphenoxy)ethylaniline (104 parts), while keeping the temperature at 0° to 5° C. The reaction mixture was adjusted to pH 3 by the addition of sodium carbonate, and the solid therein was collected on a filter and washed to obtain a monoazo compound of the following formula (1).

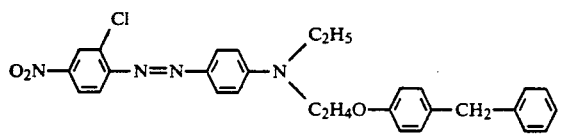
(1)

The maximum absorption wave length ($\lambda$max) of the compound in dimethylformamide was found to be 514 nm.

The compound obtained (1.0 part) was finely pulverized in an aqueous medium with the aid of naphthalenesulfonic acid-formaldehyde condensate (3.0 parts). The resulting dye dispersion was dried to form powder.

Polyester cloth (10 parts, Tetron jersey, a product of Teijin Limited, in Japan) was dipped in a dyebath containing the powder (0.6 part), and dyeing was continued for 60 minutes at 130° to 135° C. under increased pressures. The dyed cloth was subjected to reduction-rinsing treatment at 85° C. for 10 minutes in a solution of sodium hydroxide (3 parts), hydrosulfite (3 parts) and a betaine amphoteric surfactant (3 parts) in water (3000 parts), washed with water and then dried, thereby obtaining a dyed product of a red color superior in light fastness, sublimation fastness and wet fastness.

The dyed product thus obtained was subjected to softening and anti-static finishing in the following manner.

The dyed product was dipped in a padding liquor containing a soft-finishing agent (10 g/l, Sumitex Softener LK-1, a product of Sumitomo Chemical Co., Ltd., in Japan) and an anti-static agent (5 g/l, Sumistat F-1, a product of Sumitomo Chemical Co., Ltd., in Japan), squeezed uniformly at a pick-up of 80%, again dipped into the same padding liquor as above, squeezed at the same level as above, pre-dried at 80° C. for 2 minutes and then subjected to heat set at 170° C. for 1 minute.

The thus after-finished dyed product was found to have a superior washing fastness.

The N-ethyl-N-2-(4-benzylphenoxy)ethylaniline used above was prepared by heating a mixture of excess N-ethylaniline and 2-(4-benzyl)phenoxyethyl bromide, distilling the reaction mixture to remove unreacted N-ethylaniline and purifying the resulting residue.

EXAMPLE 2

2-Amino-6-chlorobenzothiazol (59 parts) was dispersed in 85% phosphoric acid (200 parts), and sodium nitrite (22 parts) was added to the dispersion, while keeping the temperature at −5° to 0° C., thereby performing diazotization. The resulting diazonium liquor was added to a solution of glacial acetic acid-methanol (25:2) containing N-methyl-N-3-[4-(2-phenoxyethoxy)-phenoxy] propylaniline (113 parts), while keeping the temperature at 0° to 5° C. The reaction mixture was mixed with ice water (500 parts), and the solid was collected on a filter and washed to obtain a compound of the following formula (2),

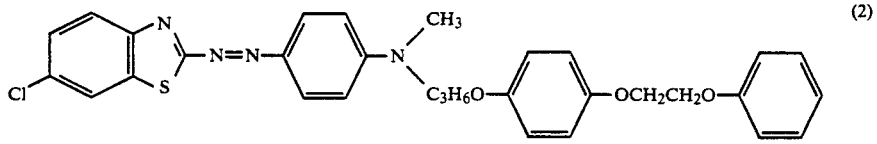
(2)

which was found to be $\lambda_{max}^{DMF}$ 526 nm.

The compound obtained (1.3 parts) was finely pulverized with the aid of lignin sulfonic acid (3.7 parts). To the resulting dispersion were added hot water (35 parts) and a half emulsion paste (60 parts) having the following composition.

| | |
|---|---|
| O/W Emulsion | 300 parts |
| Stock paste (12% Maypro gum) | 694 parts |
| Sodium Chlorate | 4 parts |
| Tartaric acid | 2 parts |

Polyester cloth (Tetron tropical, a product of Teijin Limited in Japan) was printed with the above obtained printing paste, pre-dried and steamed for 7 minutes at 170° C. under atmospheric pressure. The printed cloth was subjected to reduction rinsing treatment, washing with water and softening and anti-static finishings in this order in a manner similar to that of Example 1. The thus obtained printed product of a red color was found to have superior light, sublimation and wet fastness properties, particularly washing fastness.

The N-methyl-N-3-[4-(2-phenoxyethoxy)phenoxy] propylaniline used above as the coupling component was prepared using N-methylaniline and 3-[4-(2-phenoxyethoxy)phenoxy]propyl chloride in a manner similar to that described in Example 1.

EXAMPLES 3 to 104

Compounds shown in the following table were obtained in manners similar to those of Examples 1 and 2, and the color of dyed product obtained by dyeing polyester fiber with the compounds was as shown in the table, and washing fastness thereof was found to be excellent.

| Example No. | Compound obtained | λmax [nm] |
|---|---|---|
| 3 | 2,4-dinitro-6-chlorophenyl-azo-[4-(2-(4-benzoyloxyphenoxy)ethylamino)-3-acetamido-6-chloro]phenyl | 578 |
| 4 | 2-chloro-4-nitrophenyl-azo-[4-(N-ethyl-N-(2-(3-benzoyloxyphenoxy)ethyl)amino)]phenyl | 514 |
| 5 | 2,4-dinitro-6-chlorophenyl-azo-[4-(N-benzyl-N-(2-(4-benzoyloxyphenoxy)ethyl)amino)]phenyl | 545 |
| 6 | 2,4-dinitro-6-chlorophenyl-azo-[4-(N-ethyl-N-(2-(4-benzoyloxyphenoxy)ethyl)amino)-3-methyl]phenyl | 562 |
| 7 | 5,6-dichloro-benzothiazol-2-yl-azo-[6-(1-(2-(4-phenoxyphenoxy)ethyl)-2,2,4-trimethyl-1,2,3,4-tetrahydroquinolin-6-yl)] | 535 |
| 8 | 5,6-dichloro-benzothiazol-2-yl-azo-[1-(2-(4-phenoxyphenoxy)ethyl)-2,2,4,7-tetramethyl-1,2,3,4-tetrahydroquinolin-6-yl] | 545 |
| 9 | 2-chloro-4-nitrophenyl-azo-[4-(N-ethyl-N-(5-(4-benzyloxyphenoxy)pentyl)amino)]phenyl | 515 |

Note: The compound column actually shows chemical structures. Representative structural descriptions:

Example 3 (λmax 578 nm): Azo dye with 2,4-dinitro-6-chlorophenyl diazo component coupled to a phenyl carrying NHCOCH₃ and NH–CH₂CH₂O–C₆H₄–OC(O)–C₆H₅ substituents, plus a Cl.

Example 4 (λmax 514 nm): 2-chloro-4-nitrophenyl-N=N-C₆H₄-N(CH₂CH₃)(CH₂CH₂O-C₆H₄-OC(O)C₆H₅) (meta-benzoyloxy).

Example 5 (λmax 545 nm): 2,4-dinitro-6-chlorophenyl-N=N-C₆H₄-N(CH₂C₆H₅)(CH₂CH₂O-C₆H₄-OC(O)C₆H₅).

Example 6 (λmax 562 nm): 2,4-dinitro-6-chlorophenyl-N=N-(3-methylphenyl)-N(CH₂CH₃)(CH₂CH₂O-C₆H₄-OC(O)C₆H₅).

Example 7 (λmax 535 nm): 5,6-dichlorobenzothiazol-2-yl-N=N- linked to 2,2,4-trimethyl-1-(2-(4-phenoxyphenoxy)ethyl)-1,2,3,4-tetrahydroquinolin-6-yl.

Example 8 (λmax 545 nm): as Example 7 but with additional 7-methyl substituent on the tetrahydroquinoline.

Example 9 (λmax 515 nm): 2-chloro-4-nitrophenyl-N=N-C₆H₄-N(CH₂CH₃)-(CH₂)₅-O-C₆H₄-O-CH₂-C₆H₅.

-continued

| Example No. | Compound obtained | λmax [nm] |
|---|---|---|
| 10 | [structure: 2-Cl-4-NO₂-phenyl-N=N-C₆H₄-N(CH₂CH₃)(CH₂)₃O-C₆H₄-OCH₂CH₂O-C₆H₅] | 514 |
| 11 | [structure: 2-CN-4-NO₂-phenyl-N=N-(3-CH₃-C₆H₃)-N(CH₂CH₂OCOCH₃)(CH₂CH₂O-C₆H₄-CH₂-C₆H₅)] | 535 |
| 12 | [structure: 2-Br-4-NO₂-6-Cl-phenyl-N=N-(3-CH₃-C₆H₃)-N(CH₂CH₃)(CH₂CH₂O-C₆H₄-CH₂CH₂OCH₂-CH₂O-C₆H₅)] | 525 |
| 13 | [structure: 2-CN-4-NO₂-6-Cl-phenyl-N=N-(3-CH₃-C₆H₃)-N(CH₂CH₃)(CH₂CH₂O-C₆H₄-OCH₂CH₂O-C₆H₅)] | 551 |
| 14 | [structure: 2-Br-4-NO₂-6-Cl-phenyl-N=N-C₆H₄-N(CH₂CH₂OCOCH₃)(CH₂CH₂O-C₆H₄-(CH₂)₄-C₆H₅)] | 480 |
| 15 | [structure: 2-CN-4-NO₂-6-Cl-phenyl-N=N-C₆H₄-N(CH₂CH₃)(CH₂CH₂O-C₆H₄-OCH(CH₃)CH₂CH₂O-C₆H₅)] | 540 |
| 16 | [structure: 4-CH₃CH₂O₂S-2-NO₂-phenyl-N=N-(3-NHCOCH₃-C₆H₃)-N(CH₂-C₆H₅)(CH₂CH₂O-C₆H₄-CH₂CH₂O-C₆H₅)] | 521 |
| 17 | [structure: 2-Cl-4-NO₂-phenyl-N=N-(3-NHCOCH₃-C₆H₃)-N(CH₂-C₆H₅)(CH₂CH₂O-C₆H₄-OCH₂C(O)-C₆H₅)] | 534 |

-continued

| Example No. | Compound obtained | λmax [nm] |
|---|---|---|
| 18 | 2-nitro-4-chloro-phenyl-azo-[4-(N-benzyl-N-(2-(4-phenoxyphenoxy)ethyl)amino)phenyl] (O₂N, Cl on left ring; N(CH₂Ph)(CH₂CH₂O-C₆H₄-OCH₂-C₆H₅) on right) | 512 |
| 19 | 4-nitro-2-cyano-phenyl-azo-[4-(N-isobutyl-N-(2-(4-benzyloxyphenoxy)ethyl)amino)phenyl] | 535 |
| 20 | 4-nitro-2-chloro-phenyl-azo-[3-methyl-4-(N-ethyl-N-(2-(4-(6-phenoxyhexyloxy)phenoxy)ethyl)amino)phenyl] | 524 |
| 21 | 5,6-dichlorobenzothiazol-2-yl-azo-[2-chloro-4-(N-H-N-(2-(4-(2-phenoxyethoxy)phenoxy)ethyl)amino)phenyl] | 510 |
| 22 | 5,6-dichlorobenzothiazol-2-yl-azo-[3-methyl-4-(N-ethyl-N-(2-(4-(2-phenoxyethoxy)phenoxy)ethyl)amino)phenyl] | 531 |
| 23 | 5,6-dichlorobenzothiazol-2-yl-azo-[3-acetamido-4-(N-ethyl-N-(2-(4-phenoxyphenoxy)ethyl)amino)phenyl] | 548 |
| 24 | 5,6-dichlorobenzothiazol-2-yl-azo-[4-(N-ethyl-N-(2-(4-(4-acetylbenzoyloxy)phenoxy)ethyl)amino)phenyl] | 530 |
| 25 | 2-bromo-4-nitro-6-trifluoromethyl-phenyl-azo-[4-(N-ethyl-N-(2-(4-benzoylphenoxy)ethyl)amino)phenyl] | 521 |
| 26 | 4-ethylsulfonyl-2-nitro-phenyl-azo-[4-(N-ethyl-N-(2-(4-phenylsulfonamidophenoxy)ethyl)amino)phenyl] | 501 |

| Example No. | Compound obtained | λmax [nm] |
|---|---|---|
| 27 | 4-(ethylsulfonyl)-2-nitrophenyl azo coupled to phenyl ring bearing NHCOCH₃ and N(CH₂CH₂O-C₆H₄-O-C₆H₅)(CH₂-C₆H₅) | 521 |
| 28 | 4-nitro-2-chlorophenyl azo coupled to phenyl ring bearing N(CH₂CH₃)(CH₂CH₂O-C₆H₄-N=CHCH₂-C₆H₅) | 514 |
| 29 | 4-nitro-2-chlorophenyl azo coupled to 2-chloro-5-(NHCOCH₃)phenyl with NH-CH₂CH₂O-C₆H₄-OCH₂CH₂O-C₆H₅ | 518 |
| 30 | 4-nitro-2-chlorophenyl azo coupled to 3-methylphenyl bearing N(CH₂CH₃)(CH₂CH₂O-C₆H₄-OCH₂CH₂-NH-CH₂-C₆H₅) | 524 |
| 31 | 2,4-dinitrophenyl azo coupled to 3-methylphenyl bearing N(CH₂CH₃)(CH₂CH₂O-C₆H₄-O-C₆H₅) | 544 |
| 32 | 2,4-dinitrophenyl azo coupled to phenyl bearing NHCOCH₃ and N(CH₂CH₂CN)(CH₂CH₂O-C₆H₄-CH₂-C₆H₅) | 583 |
| 33 | 2,4-dinitrophenyl azo coupled to 2-chloro-5-(NHCOCH₃)phenyl with NH-CH₂CH₂O-C₆H₄-SO₂-C₆H₅ | 574 |
| 34 | phenyl-N=N-(2-nitrophenylene)-N=N-phenyl bearing N(CH₂CH₃)(CH₂CH₂O-C₆H₄-O-C₆H₅) | 524 |
| 35 | 2-chloro-4,6-dinitrophenyl azo coupled to phenyl bearing N(CH₂CH₂CN)(CH₂CH₂O-C₆H₄-O-CO-C₆H₅) | 541 |

-continued

| Example No. | Compound obtained | λmax [nm] |
|---|---|---|
| 36 | (2-nitro-benzothiazol-based)-N=N-C₆H₄-N(CH₂CH₃)(CH₂CH₂O-C₆H₄-O-(CH₂)₃-O-C₆H₅) | 531 |
| 37 | (2-Br,4-Cl,6-Cl-C₆H₂)-N=N-C₆H₄-N(CH₂CH₃)(CH₂CH₂O-C₆H₄-OCO-C₆H₅) | 452 |
| 38 | (2-CN,4-Cl,6-Cl-C₆H₂)-N=N-C₆H₄-N(CH₂CH₃)(CH₂CH₂O-C₆H₄-CO-C₆H₅) | 478 |
| 39 | (2-Br,4-Cl,6-Cl-C₆H₂)-N=N-C₆H₃(NHCOCH₃)-N(CH₂CH₃)(CH₂CH₂O-C₆H₄-CO-C₆H₅) | 479 |
| 40 | (2-CN,4-Cl,6-Cl-C₆H₂)-N=N-C₆H₃(NHCOCH₃)-N(CH₂CH₃)(CH₂CH₂O-C₆H₄-NH-C₆H₅) | 505 |
| 41 | (2-NO₂,4-...,6-Cl-C₆H₃)-N=N-C₆H₃(NHCOCH₃)-N(CH₂C₆H₅)(CH₂CH₂O-C₆H₄-OCH₂C₆H₅) | 534 |
| 42 | (2-NO₂,6-Cl-C₆H₃)-N=N-C₆H₃(NHCOCH₃)-N(CH₂CH₃)(CH₂CH₂O-C₆H₄-SO₂CH₂-CH₂C₆H₅) | 541 |
| 43 | (2-NO₂,6-Cl-C₆H₃)-N=N-C₆H₃(C(CH₃)₂CH₂C(CH₃)₃)-N(CH₂CH₂O-C₆H₄-CH₂C₆H₅) | 519 |

-continued

| Example No. | Compound obtained | λmax [nm] |
|---|---|---|
| 44 | O₂N–(2-Cl-phenyl)–N=N–(phenyl)–N(CH₂CH₂O–C₆H₄–OCH₂CH₂O–CH₂CH₂O–phenyl)(CH₂CH₂OCCH₃(=O)); NHCOCH₃ substituent on central ring | 529 |
| 45 | O₂N–(2-Cl-phenyl)–N=N–(phenyl)–N(CH₂–phenyl)(CH₂CH₂O–C₆H₄–O–C(=O)–phenyl) | 507 |
| 46 | 2,6-Br₂-4-CH₃-phenyl–N=N–(phenyl)–N(CH₂CH₂O–C₆H₄–O–C(=O)–phenyl)(CH₂CH₃) | 429 |
| 47 | 2,6-(CN)₂-4-CH₃-phenyl–N=N–(phenyl)–N(CH₂CH₂O–C₆H₄–O–C(=O)–phenyl)(CH₂CH₃) | 509 |
| 48 | O₂N-(2-Br-phenyl)–N=N–(phenyl)–N(CH₂CH₂CH₂O–C₆H₄–CH₂–phenyl)(CH₃) | 515 |
| 49 | (2-SO₂CH₃, 4-Cl, 6-Br-phenyl)–N=N–(phenyl)–N(CH₂CH₂O–C₆H₄–O–C(=O)–phenyl)(CH₂CH₃); NHCOCH₃ substituent on central ring | 480 |
| 50 | (2-SO₂CH₃, 4-Cl, 6-Br-phenyl)–N=N–(phenyl)–N(CH₂CH₂O–C₆H₄–O–C(=O)–phenyl)(CH₂CH₃) | 449 |
| 51 | (2-CN, 4-O₂N-phenyl)–N=N–(phenyl)–N(CH₂CH₂O–C₆H₄–CH₂–phenyl)(CH₃); NHSO₂CH₃ substituent on central ring | 530 |

-continued

| Example No. | Compound obtained | λmax [nm] |
|---|---|---|
| 52 | 4-Cl, 6-Br, 2-SO₂CH₃-phenyl–N=N–[3-NHCOCH₃-4-(N-ethyl-N-(2-(4-benzamidophenoxy)ethyl)amino)phenyl] | 478 |
| 53 | 4-Cl, 6-CN, 2-SO₂CH₃-phenyl–N=N–[3-NHCOCH₃-4-(N-ethyl-N-(2-(4-benzamidophenoxy)ethyl)amino)phenyl] | 528 |
| 54 | 2,6-diBr-4-CH₃O₂S-phenyl–N=N–[4-(N-ethyl-N-(2-(4-phenoxyphenoxy)ethyl)amino)phenyl] | 456 |
| 55 | 2,6-diCN-4-CH₃O₂S-phenyl–N=N–[4-(N-ethyl-N-(2-(4-phenoxyphenoxy)ethyl)amino)phenyl] | 524 |
| 56 | 4-Cl, 6-CF₃, 2-CN-phenyl–N=N–[3-NHCOCH₃-4-(N-ethyl-N-(2-(4-phenoxycarbonylphenoxy)ethyl)amino)phenyl] | 531 |
| 57 | 4-Cl, 6-CF₃, 2-Cl-phenyl–N=N–[4-(N-ethyl-N-(2-(4-(N-phenylcarbamoyl)phenoxy)ethyl)amino)phenyl] | 464 |
| 58 | 2,4-diNO₂-phenyl–N=N–[4-(N-ethyl-N-(2-(4-phenylthiophenoxy)ethyl)amino)phenyl] | 534 |
| 59 | 2,4-diNO₂-phenyl–N=N–[4-(N-benzyl-N-(2-(4-anilinophenoxy)ethyl)amino)phenyl] | 527 |

-continued

| Example No. | Compound obtained | λmax [nm] |
|---|---|---|
| 60 | 2,4-dinitrophenyl-azo-phenyl-N(CH₂CH₂CN)(CH₂CH₂O-C₆H₄-OCH₂-C₆H₅) | 509 |
| 61 | Ph-N=N-C₆H₄-N=N-C₆H₄-N(C₂H₅)(CH₂CH₂O-C₆H₄-CH₂-C₆H₅) | 484 |
| 62 | Ph-N=N-C₆H₄-N=N-C₆H₃(NHCOCH₃)-N(C₂H₅)(CH₂CH₂O-C₆H₄-CH₂-C₆H₅) | 511 |
| 63 | 4-O₂N-2-Cl-C₆H₃-N=N-C₆H₃(NHCOCH₃)-N(C₂H₅)(CH₂CH₂O-C₆H₄-NHCOC₆H₅) | 540 |
| 64 | 4-O₂N-2-Cl-C₆H₃-N=N-C₆H₃(NHCOCH₃)-N(CH₂C₆H₅)(CH₂CH₂O-C₆H₄-NHCOC₆H₅) | 531 |
| 65 | Ph-N=N-C₆H₄-N=N-C₆H₃(NHCOCH₃)-N(CH₂C₆H₅)(CH₂CH₂O-C₆H₄-O-C₆H₅) | 502 |
| 66 | 4-CH₃O₂S-2,6-Br₂-C₆H₂-N=N-C₆H₃(NHCOCH₃)-N(C₂H₅)(CH₂CH₂O-C₆H₄-OCH(CH₃)CH₂O-C₆H₅) | 471 |
| 67 | 4-CH₃O₂S-2,6-(CN)₂-C₆H₂-N=N-C₆H₃(NHCOCH₃)-N(C₂H₅)(CH₂CH₂O-C₆H₄-OCH(CH₃)CH₂-C₆H₅) | 561 |
| 68 | 2-CF₃-4-Cl-6-Br-C₆H₂-N=N-C₆H₄-N(C₂H₅)(CH₂CH₂O-C₆H₄-CH₂-C₆H₅) | 464 |

-continued

| Example No. | Compound obtained | λmax [nm] |
|---|---|---|
| 69 | (structure: 4-Cl, 3-CF₃, 6-CN phenyl)–N=N–(phenyl)–N(CH₂CH₃)(CH₂CH₂O–C₆H₄–CH₂–C₆H₅) | 504 |
| 70 | (structure: 4-Cl, 3-CF₃, 6-Br phenyl)–N=N–(phenyl with NHCOCH₃)–N(CH₂CH₃)(CH₂CH₂O–C₆H₄–CH₂–C₆H₅) | 491 |
| 71 | (structure: 2,6-Br₂, 4-Cl phenyl)–N=N–(phenyl)–N(CH₂CH₃)(CH₂CH₂O–C₆H₄–OCH₂CH₂OCH₂O–C₆H₅) | 444 |
| 72 | (structure: 2,6-(CN)₂, 4-CH₃ phenyl)–N=N–(phenyl with NHC(=O)NH₂)–N(CH₃)(CH₂CH₂O–C₆H₄–C(=O)–C₆H₅) | 535 |
| 73 | (structure: 2,6-Br₂, 4-Cl phenyl)–N=N–(phenyl)–N(CH₂C₆H₅)(CH₂CH₂O–C₆H₄–OCH₂O–C₆H₅) | 435 |
| 74 | (structure: 2,6-(CN)₂, 4-Cl phenyl)–N=N–(phenyl)–N(CH₂C₆H₅)(CH₂CH₂O–C₆H₄–CH₂CH₂OC(=O)–C₆H₅) | 515 |
| 75 | (structure: 2,6-Br₂, 4-Cl phenyl)–N=N–(phenyl with NHCOCH₃)–N(CH₂CH₃)(CH₂CH₂O–C₆H₄–OCH₂–C₆H₅) | 451 |

-continued

| Example No. | Compound obtained | λmax [nm] |
|---|---|---|
| 76 | (structure) | 586 |
| 77 | (structure) | 578 |
| 78 | (structure) | 529 |
| 79 | (structure) | 496 |
| 80 | (structure) | 526 |
| 81 | (structure) | 494 |
| 82 | (structure) | 511 |
| 83 | (structure) | 529 |

-continued

| Example No. | Compound obtained | λmax [nm] |
|---|---|---|
| 84 | (structure: 4-Cl-2,6-dicyanophenyl-N=N-[3-NHCOCH₃-4-(N(CH₂CH₃)(CH₂CH₂O-C₆H₄-SO₂NH-C₆H₅))phenyl]) | 551 |
| 85 | (structure: 2-CF₃-4-Br-6-Br-phenyl-N=N-[4-(N(CH₂CH₃)(CH₂CH₂O-C₆H₄-OCH₂CH₂NH-C₆H₅))phenyl]) | 464 |
| 86 | (structure: 2-CF₃-4-Br-6-CN-phenyl-N=N-[4-(N(CH₂CH₃)(CH₂CH₂O-C₆H₄-OCH₂CH₂SO₂-C₆H₅))phenyl]) | 504 |
| 87 | (structure: 2-CF₃-4-Br-6-Br-phenyl-N=N-[3-NHCOCH₃-4-(N(CH₂CH₃)(CH₂CH₂O-C₆H₄-NHSO₂-C₆H₅))phenyl]) | 491 |
| 88 | (structure: 2-CF₃-4-Br-6-CN-phenyl-N=N-[3-NHCOCH₃-4-(N(CH₂CH₃)(CH₂CH₂O-C₆H₄-NHSO₂-C₆H₅))phenyl]) | 535 |
| 89 | (structure: 2-CN-4-NO₂-6-CF₃-phenyl-N=N-[4-(N(CH₂CH=CH₂)(CH₂CH₂O-C₆H₄-CH₂-C₆H₅))phenyl]) | 585 |
| 90 | (benzisothiazol-3-yl-N=N-[4-(N(CH₂CH₃)(CH₂CH₂O-C₆H₄-OCH₂O-C₆H₅))phenyl]) | 576 |
| 91 | (4-Br-6-Cl-benzisothiazol-3-yl-N=N-[4-(N(CH₂CH₃)(CH₂CH₂O-C₆H₄-OCH₂CH₂O-C₆H₅))phenyl]) | 596 |

-continued

| Example No. | Compound obtained | λmax [nm] |
|---|---|---|
| 92 | (7-chloro-5-nitro-benzo[2,1,3]thiadiazol-4-yl)–N=N–[phenyl with NHCOC₂H₅ substituent]–N(CH₂CH₃)(CH₂CH₂O–C₆H₄–OCH₂–C₆H₄–O–phenyl) | 625 |
| 93 | O₂N–[phenyl with CN]–N=N–[phenyl]–N(CH₂CH₃)(CH₂CH₂O–C₆H₄–OCH₂–phenyl) | 540 |
| 94 | CH₃CH₂S–[thiadiazole]–N=N–[phenyl with NHCOCH₃]–N(CH₂CH₂CN)(CH₂CH₂O–C₆H₄–CH₂–phenyl) | 515 |
| 95 | CNCH₂S–[thiadiazole]–N=N–[phenyl with NHCOCH₃]–N(CH₂CH₂CN)(CH₂CH₂O–C₆H₄–CH₂–phenyl) | 520 |
| 96 | phenyl–N=N–[phenyl]–N=N–[phenyl]–N(CH₂CH₂OCH₃)(CH₂CH₂O–C₆H₄–NH–phenyl) | 484 |
| 97 | phenyl–N=N–[phenyl]–N=N–[phenyl with NHCOCH₃]–N(CH₂–phenyl)(CH₂CH₂O–C₆H₄–NH–phenyl) | 502 |
| 98 | phenyl–N=N–[phenyl]–N=N–[phenyl]–N(CH₂–phenyl)(CH₂CH₂O–C₆H₄–O–phenyl) | 473 |
| 99 | O₂N–[2-chloro-phenyl]–N=N–[phenyl]–N(CH₂CH₃)(CH₂CH₂O–C₆H₄–CH₂–phenyl) | 515 |

| Example No. | Compound obtained | λmax [nm] |
|---|---|---|
| 100 | ![Structure 100] | 510 |
| 101 | ![Structure 101] | 495 |
| 102 | ![Structure 102] | 505 |
| 103 | ![Structure 103] | 515 |
| 104 | ![Structure 104] | 535 |

We claim:

1. A monoazo compound represented by the following formula:

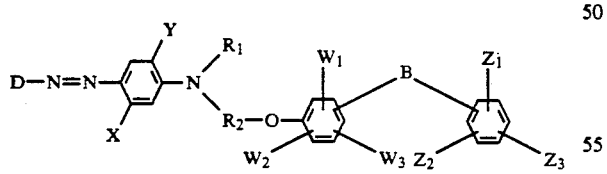

wherein

D is benzothiazolyl unsubstituted or substituted once or twice by methyl, methoxy, chloro, bromo, methylsulfonyl, or nitro; or phenyl unsubstituted or substituted once, twice, three times or four times by cyano, methylsulfonyl, ethylsulfonyl, chloro, bromo, formyl, acetyl, benzoyl, carbomethoxy, carboethoxy, methoxy, ethoxy, nitro or methyl;

X is hydrogen, $C_1$ to $C_4$ alkyl, $C_1$-$C_4$ alkoxy, halogeno, —NH—CO—NHQ, or acylamino which is selected from acetylamino, propionylamino, 2-chloroethylcarbonylamino, 2-bromoethylcarbonylamino, phenylcarbonylamino, 2-methoxycarbonylethylcarbonylamino, 2-ethoxycarbonylethylcarbonylamino, methoxycarbonylamino, ethoxycarbonylamino, phenoxycarbonylamino, methoxyethylcarbonylamino, hydroxyethylcarbonylamino, methylsulfonylamino and ethylsulfonylamino;

Q is hydrogen, $C_1$-$C_4$ alkyl or phenyl;

Y is hydrogen or halogeno;

$R_1$ is hydrogen, $C_1$-$C_6$ alkyl unsubstituted or substituted by $C_1$-$C_4$ alkoxy, $C_1$-$C_4$ alkoxy carbonyl, $C_1$-$C_4$ alkylcarbonyloxy, $C_1$-$C_4$ alkoxycarbonyloxy, phenyl, phenoxy, benzoyloxy or cyano, or $C_3$-$C_5$ alkenyl;

or $R_1$ and $Y_1$ are taken together with the adjacent nitrogen and two carbon atoms, respectively, to form a 6-membered ring thereby constituting a dihydroquinoline or tetrahydroquinoline ring formed by uniting the 6-membered ring and the existing benzene ring, in which the 6-membered ring is unsubstituted or substituted by 1 to 4 methyl groups;

$R_2$ is straight or branched $C_2$-$C_4$ alkylene unsubstituted or substituted by hydroxy;

$W_1$, $W_2$, $W_3$, $Z_1$, $Z_2$, and $Z_3$ independently of one another are each hydrogen, chloro, bromo, $C_1$-$C_4$ alkyl, $C_1$-$C_4$ alkoxy, $C_1$-$C_4$ alkoxycarbonyl or nitro; and B is a bridging group selected from carbonyl, carbonyloxy, oxycarbonyl, imino, —O—, —S—, —CH=N—, —SO$_2$—,

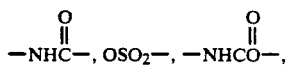

straight or branched $C_1$-$C_6$ alkylene or —A$_1$—E$_1$—A$_2$—E$_2$—A$_3$— in which A$_1$, A$_2$ and A$_3$ independently of one another are each a direct linkage, carbonyl, carbonyloxy, oxycarbonyloxy, imino, —O—, —S—, —CH=N—, —SO$_2$—,

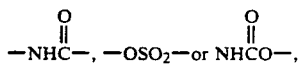

and E$_1$ and E$_2$ independently of one another are each a direct linkage or straight or branched $C_1$-$C_6$ alkylene, provided that E$_1$ is the alkylene as defined above when A$_1$ is not a direct linkage, E$_2$ is the alkylene as defined above when A$_3$ is not a direct linkage, and both E$_1$ and E$_2$ are not direct linkages at the same time when A$_2$ is a direct linkage;

with the proviso that B is any one of the bridging groups other than —S— and the $C_1$-$C_6$ alkylene as defined above, when D is the benzothiazolyl as defined above.

2. The compound according to claim 1, wherein D is benzothiazolyl unsubstituted or substituted once or twice by chloro, bromo or methoxy, or phenyl unsubstituted or substituted once, twice, three times or four times by nitro, chloro, bromo, cyano, methylsulfonyl, ethylsulfonyl or methyl.

3. The compound according to claim 1, wherein X is hydrogen, methyl, methoxy, chloro, bromo, acetylamino, propionylamino, methylsulfonylamino or ureido.

4. The compound according to claim 1, wherein Y is hydrogen, chloro or bromo.

5. The compound according to claim 1, wherein $R_1$ is $C_1$-$C_4$ alkyl unsubstituted or substituted by $C_1$-$C_4$ alkoxy, $C_1$-$C_4$ alkylcarbonyloxy, $C_1$-$C_4$ alkoxycarbonyl, phenoxy or phenyl.

6. The compound according to claim 1, wherein B is carbonyl, —O—, —S— or straight or branched $C_1$-$C_6$ alkylene.

7. The compound according to claim 1, wherein B is —A$_1$—E$_1$—A$_2$—E$_2$—A$_3$— in which A$_1$, A$_2$ and A$_3$ independently of one another are each direct linkage, carbonyloxy or —O—, and E$_1$ and E$_2$ are as defined by claim 1.

* * * * *